United States Patent
Hergott et al.

(10) Patent No.: US 6,659,853 B1
(45) Date of Patent: Dec. 9, 2003

(54) METHOD AND MEANS FOR STUFFING NATURAL CASINGS WITH SAUSAGE EMULSION

(75) Inventors: Steven P. Hergott, West Des Moines, IA (US); David S. Hamblin, Norwalk, IA (US); Michael J. Hardy, West Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/389,372

(22) Filed: Mar. 14, 2003

Related U.S. Application Data

(60) Division of application No. 10/226,826, filed on Aug. 23, 2002, now Pat. No. 6,585,580, which is a continuation-in-part of application No. 10/160,931, filed on May 31, 2002, which is a continuation-in-part of application No. 10/210,122, filed on Aug. 1, 2002, now Pat. No. 6,572,464.

(51) Int. Cl.$^7$ .............................................. A22C 11/00
(52) U.S. Cl. ........................................................ 452/31
(58) Field of Search ..................................... 452/30–36

(56) References Cited

U.S. PATENT DOCUMENTS

| | | |
|---|---|---|
| 2,568,491 A | 9/1951 | Edwards |
| 3,150,410 A | 9/1964 | Washburn |
| 3,404,430 A | 10/1968 | Kielsmeier et al. |
| 3,480,449 A | 11/1969 | Sumption |
| 3,672,001 A | 6/1972 | Austin |
| 3,805,329 A | 4/1974 | Gunter |
| 3,826,852 A | 7/1974 | Levaco et al. |
| 3,964,236 A | 6/1976 | Smith |
| 4,112,546 A | 9/1978 | Muller |
| RE30,390 E | 9/1980 | Kupcikevicius et al. |
| 4,257,146 A | 3/1981 | Karp |
| 4,434,527 A | 3/1984 | Staudenrausch et al. |

(List continued on next page.)

FOREIGN PATENT DOCUMENTS

| | | |
|---|---|---|
| DE | 1136604 | 9/1962 |
| FR | 2780246 | 12/1999 |

Primary Examiner—Thomas Price

(57) ABSTRACT

A method of stuffing natural casings with emulsion involves slidably mounting a collar element on the stuffing tube of the machine adjacent an end of the stuffing tube opposite to the discharge end thereof. The collar is slidably advanced towards the discharge end of the tube to telescope the casing into a shirred condition while leaving a non-shirred portion downstream thereof. The non-shirred portion of the casing is progressively advanced while the casing is filled with emulsion from the tube. A sensor is placed in the proximity of the non-shirred portion of the casing to detect whether shirred or non-shirred casing is present. The sensor is connected to a controller so that the collar will be advanced to slide the casing material on the tube when the non-shirred casing is detected, and the advance of the collar is stopped when shirred casing material is detected. A machine includes the foregoing components to accomplish the method.

8 Claims, 5 Drawing Sheets

U.S. PATENT DOCUMENTS

| | | |
|---|---|---|
| 4,437,209 A | 3/1984 | Durvon |
| 4,438,545 A | 3/1984 | Kupcikevicius et al. |
| 4,489,460 A | 12/1984 | Nausedas |
| 4,525,895 A | 7/1985 | Raudys |
| 4,580,316 A * | 4/1986 | Gunter ................. 452/22 |
| 4,593,433 A | 6/1986 | Nausedas |
| 4,642,848 A | 2/1987 | Kollross |
| 4,649,602 A | 3/1987 | Kupcikevicius |
| 4,692,966 A * | 9/1987 | Nausedas ............. 452/31 |
| 4,768,261 A * | 9/1988 | Nakamura ............ 452/33 |
| 4,893,377 A | 1/1990 | Evans et al. |
| 4,970,758 A | 11/1990 | Naples et al. |
| 4,991,260 A | 2/1991 | Nausedas |
| 5,046,219 A | 9/1991 | Stanley |
| 5,092,814 A | 3/1992 | Kasai et al. |
| 5,147,239 A | 9/1992 | Staudenrausch |
| 5,297,983 A | 3/1994 | Mueller et al. |
| 5,354,228 A | 10/1994 | Smith et al. |
| 5,399,213 A | 3/1995 | Oxley |
| 5,573,454 A * | 11/1996 | Fox et al. ............. 452/29 |
| 5,743,792 A | 4/1998 | Hanten et al. |
| 5,813,906 A | 9/1998 | Phillips |
| 5,842,914 A | 12/1998 | Vermeer et al. |
| 6,056,635 A | 5/2000 | Vermeer et al. |
| 6,066,035 A | 5/2000 | Hergott et al. |
| 6,066,036 A | 5/2000 | Carollo |
| 6,139,416 A | 10/2000 | Toepfer |
| 6,183,826 B1 * | 2/2001 | Quinones et al. ......... 428/34.8 |

* cited by examiner

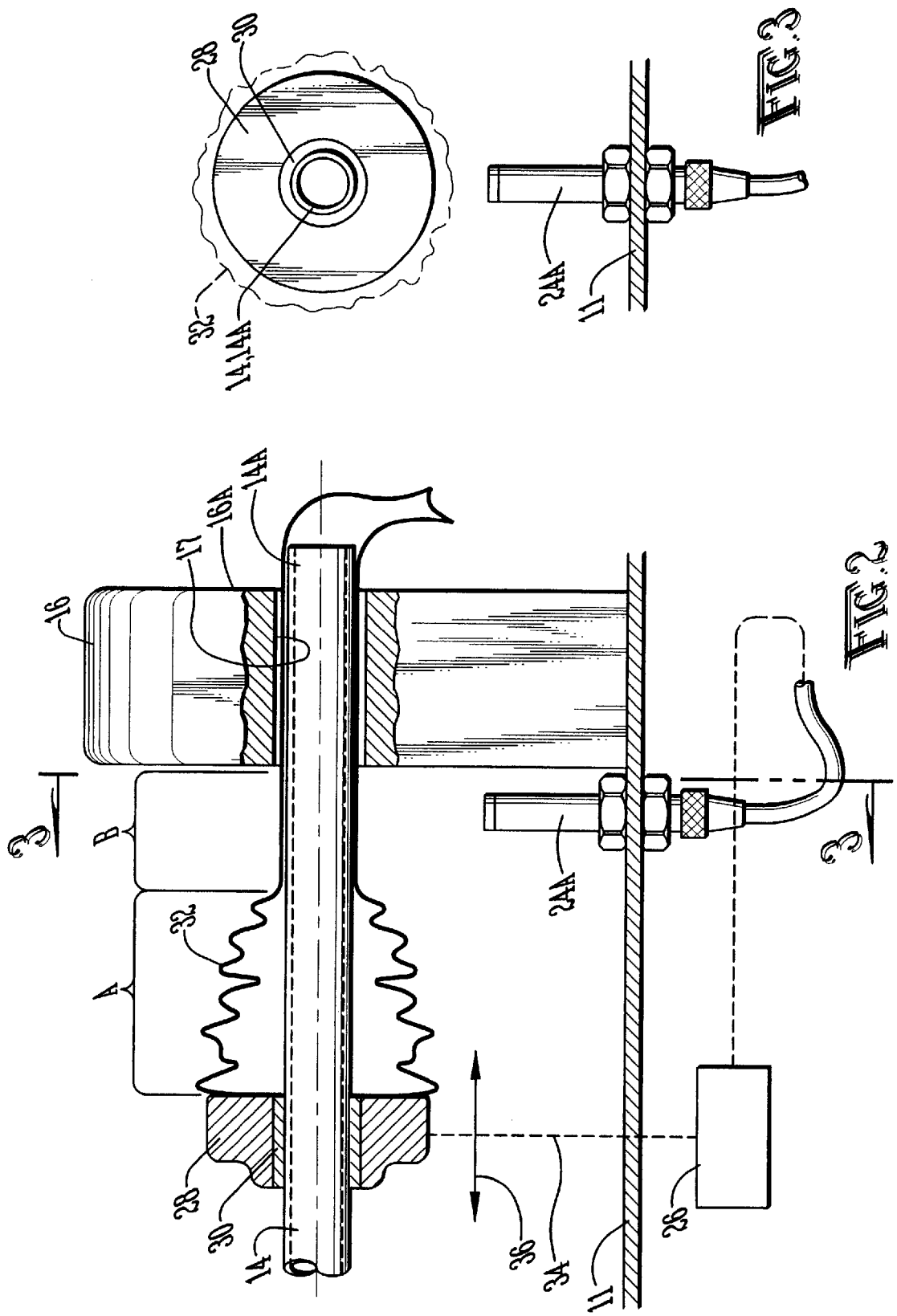

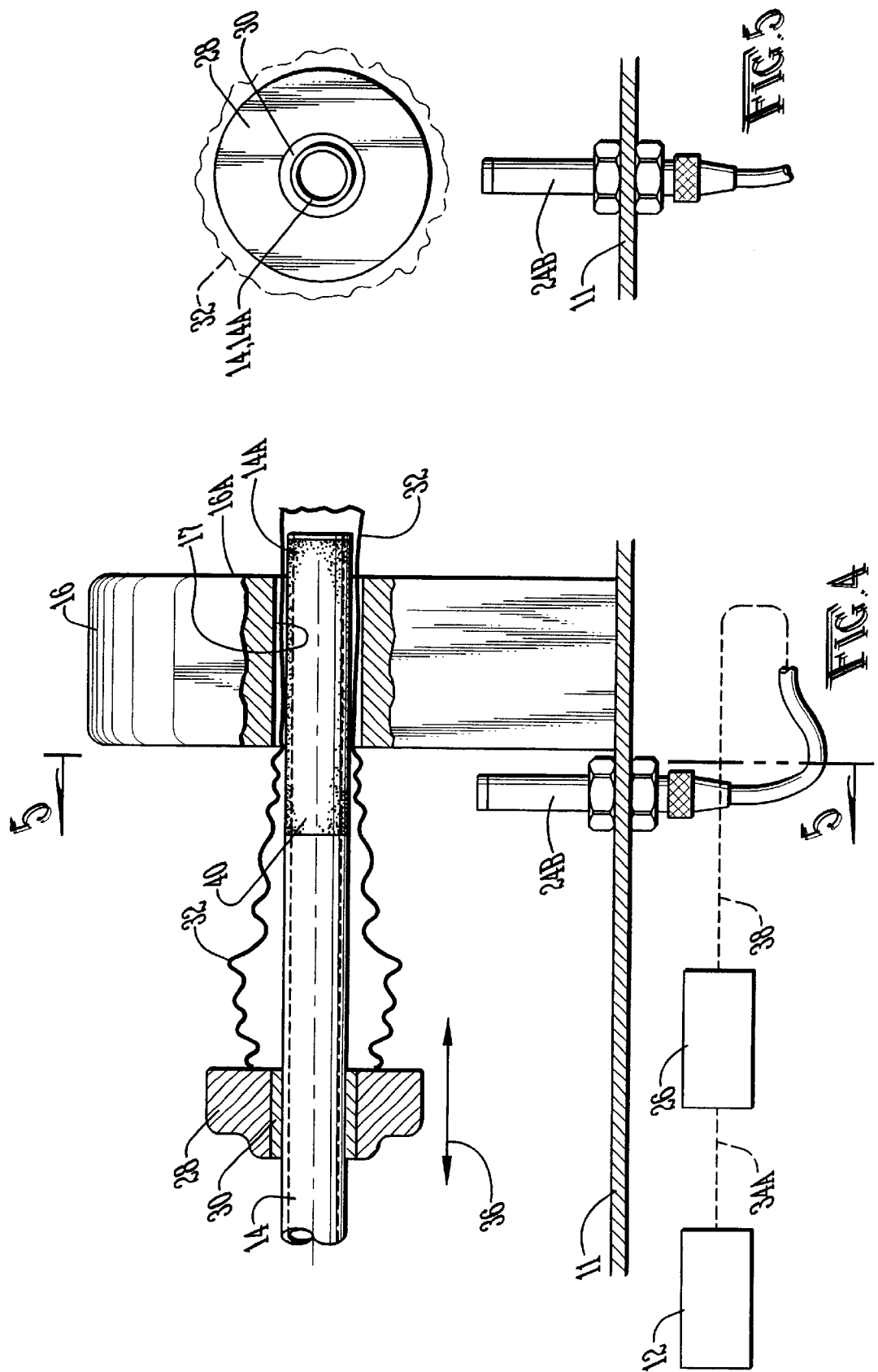

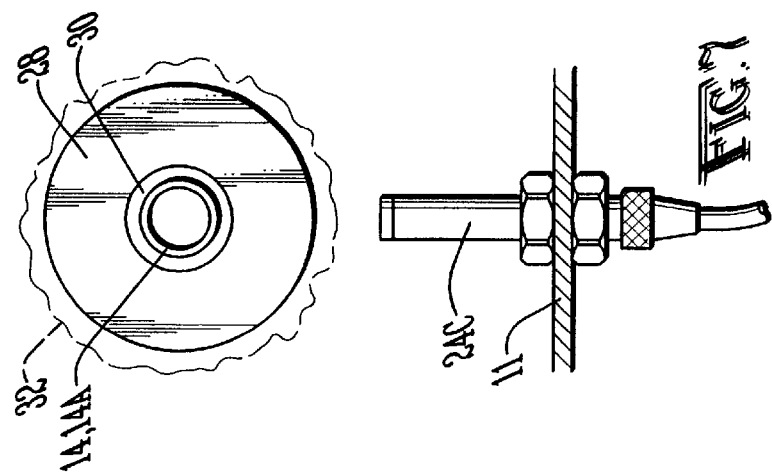
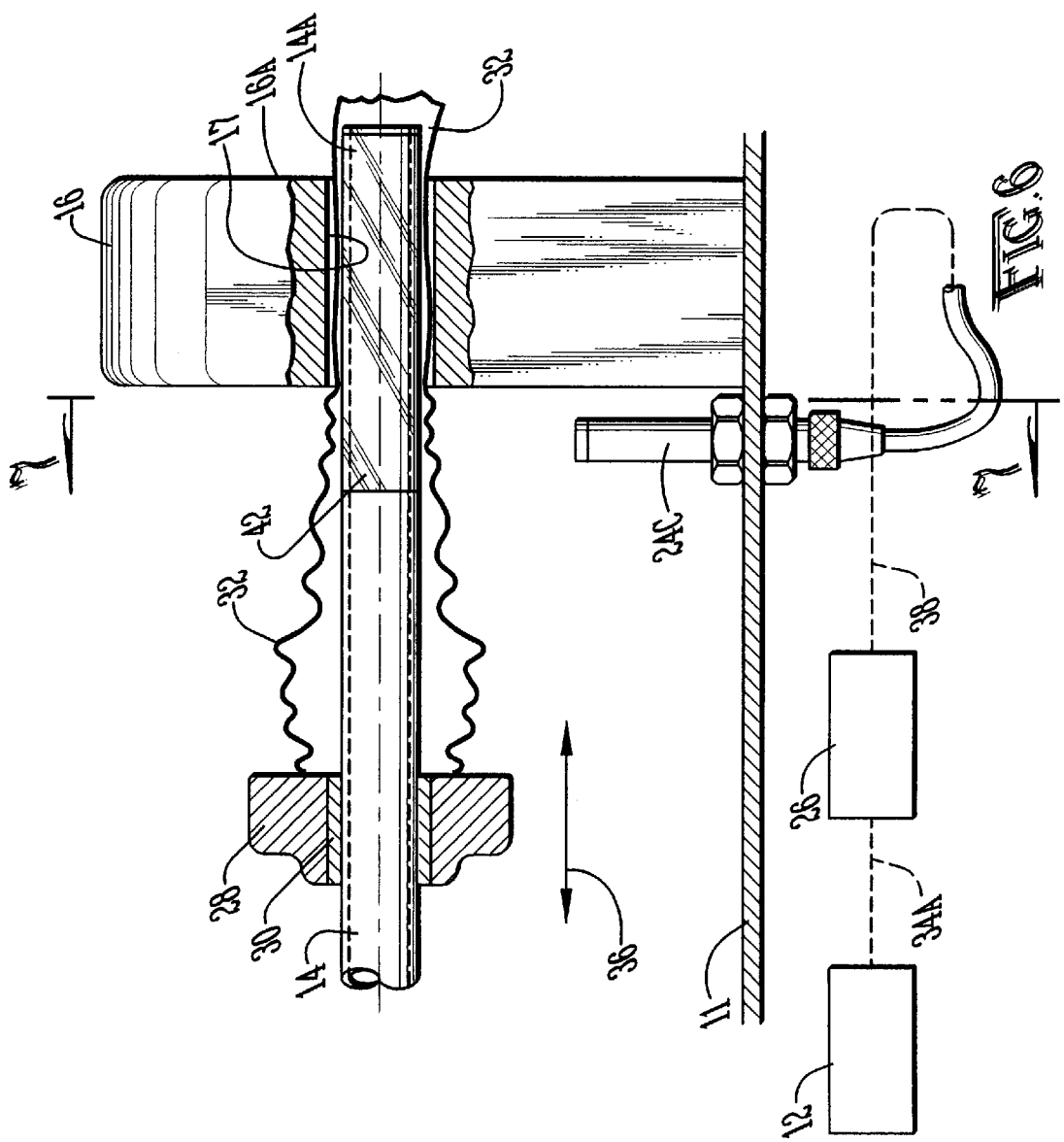

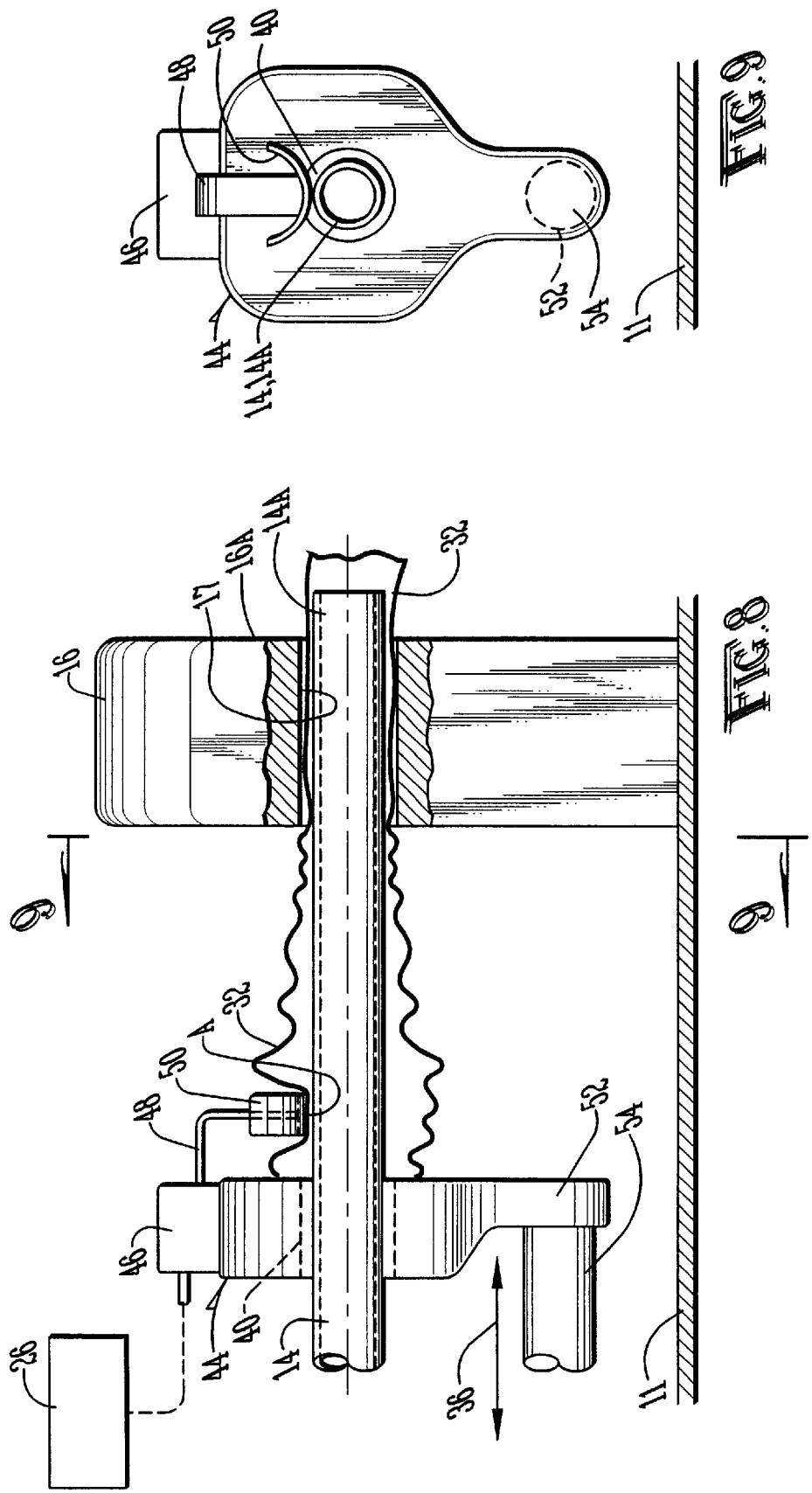

METHOD AND MEANS FOR STUFFING NATURAL CASINGS WITH SAUSAGE EMULSION

This application is a division of U.S. Ser. No. 10/226,826 filed Aug. 23, 2002 now U.S. Pat. No. 6,585,580, which is a CIP of Ser. No. 10/160,931 filed May 31, 2002 and Ser. No. 10/210,122 filed Aug. 1, 2002 now U.S. Pat. No. 6,572,462.

BACKGROUND OF THE INVENTION

Sausages have been traditionally made by filling the natural intestines of sheep or other animals, with a sausage product whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings including their relatively shorter and variable length and non-uniform diameter, modern sausage encasing machines have not achieved the volume and capacity with natural casings as they do with artificial casings.

It is therefore a principal object of this invention to provide a method and a machine for encasing sausages whereby the position of the casing on the stuffing tube is monitored by a sensor.

A further object of this invention is to provide a method and a machine for encasing sausage which employs a sensor on the stuffing tube to detect the end of the natural casings.

A further object of this invention is to provide a method and machine for encasing sausage which employs a sensor which can detect the diameter difference between the casings in the shirred state and in its non-shirred condition.

A still further object of this invention is to use a plurality of different types of sensors to determine the position and condition of the natural casing.

These and other objects will be apparent to those skilled in the art.

SUMMARY OF THE INVENTION

A method of stuffing natural casings with emulsion involves slidably mounting a collar element on the stuffing tube of the machine adjacent an end of the stuffing tube opposite to the discharge end thereof. The collar is slidably advanced towards the discharge end of the tube to telescope the casing into a shirred condition while leaving a non-shirred portion downstream thereof. The non-shirred portion of the casing is progressively advanced while the casing is filled with emulsion from the tube. A sensor is placed in the proximity of the non-shirred portion of the casing to detect whether shirred or non-shirred casing is present. The sensor is connected to a controller so that the collar will be advanced to slide the casing material on the tube when the non-shirred casing is detected, and the advance of the collar is stopped when shirred casing material is detected.

A machine includes the foregoing components to accomplish the method.

DESCRIPTION OF THE DRAWINGS

FIG. 2 is a partial sectional longitudinal view showing the forward end of the stuffing tube adjacent the twister with the follower bushing shown in section;

FIG. 3 is a front elevational view of the stuffing tube and the components upstream of the twister thereof as seen generally on line 3—3 of FIG. 2;

FIG. 4 is a view similar to FIG. 2 but shows an alternate form of the invention;

FIG. 5 is an elevational view similar to FIG. 3 but taken on line 5—5 of FIG. 4;

FIG. 6 is a view similar to FIG. 4 but shows a second alternative form of the invention;

FIG. 7 is an elevational view similar to FIG. 5 being taken on line 7—7 of FIG. 6;

FIG. 8 is a side elevational view of a third alternate form of the invention similar to FIG. 1; and FIG. 9 is an elevational view similar to FIG. 7 taken on line 9—9 of FIG. 8.

DESCRIPTION OF THE EMBODIMENTS OF THE INVENTION

Figure 1:
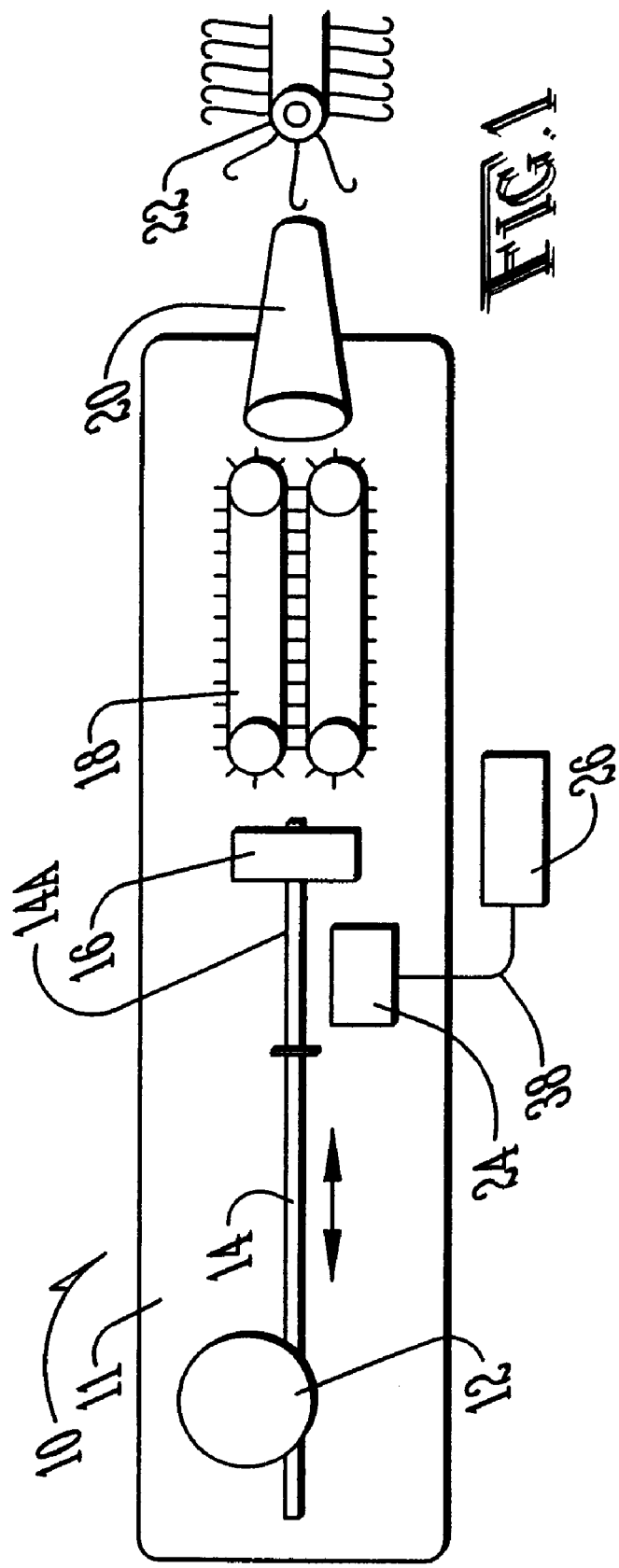
FIG. 1 is a plan view of a sausage making machine showing the conventional components, as modified by this invention.

The term "emulsion" as used herein includes meat or any other edible substance.

With reference to FIG. 1, a conventional sausage making machine 10 has a frame 11, a pump 12 connected to a source of emulsion (not shown), a slidable stuffing tube 14, a twisting mechanism 16, a linking mechanism 18, a discharge horn 20, and a conveyor 22. The numeral 24 in FIG. 1 designates generically any one of a plurality of sensors to be described hereafter which are adapted to send a signal to a controller 26 to control various components of the machine as also described hereafter. Twisting mechanism 16 includes a center bore 16A and a conventional chuck 17.

With particular reference to FIGS. 1–3, a hollow follower or collar 28 with a center bushing 30 is slidably mounted on stuffing tube 14. A natural animal casing 32 is placed on the outer surface of the tube 14 downstream from collar 28. The natural animal casing 32 extends between the collar and the discharge end 14A of tube 14. The dotted line 34 extending between collar 28 and controller 26 designates the control mechanism whereby the controller 26 controls the movement of collar 28 in a forward or rearward direction as depicted by the arrow 36. The specific control mechanism can be a suitable power means to be discussed hereafter.

The line 38 shows the connection between the controller 26 and the sensor 24A which is located on frame 11 adjacent the discharge end 14A of stuffing tube 14.

The collar 28 is used to assist the casing 32 off of the stuffing tube 14 and into twister 16 while emulsion is conventionally being pumped into the interior of the casing through tube 14. The emulsion is pumped through tube 14 by pump 12 shown in FIG. 1. The natural casing is formed into a linked product by the cooperative activity of twisting mechanism 16 and linking mechanism 18. The linked product is delivered through horn 20 to conveyor 22.

The sensor 24A is positioned as described above. When the casing 32 is shirred, as shown by Zone A in FIG. 2, it has a larger diameter than when it is in the non-shirred condition in Zone B. The sensor 24A senses this change in diameter and sends a signal to the controller 26. This signal then controls the movement of the collar 28 by advancing the collar 28 when the non-shirred diameter is sensed, and stopping the advance or retracting slightly the collar when the shirred diameter is detected. Sensor 24A may be comprised of a conventional ultrasonic or optical sensing unit.

The sensor measures the distance between the sensor and the casing. The upper and lower limits of this distance are adjustable within the software to vary the triggering of the advance of collar 28.

An alternate form of the invention is shown in FIGS. 4 and 5 which is substantially identical to the form of the invention shown in FIGS. 2 and 3 except that a colorized portion 40 is imposed on the surface of stuffing tube 14 adjacent its discharge end 14A. The sensor 24B of conventional construction is capable of sensing the colored portion 14 as the stuffing tube 14 is moved forwardly to a position adjacent twisting mechanism 16. The sensor 24B will not sense the colored portion 14 until the casing 32 is about to depart the discharge end 14A of the tube 14. When the sensor 24B senses the colored portion 40, after the portion 40 is uncovered by the departing casing 32, the sensor will send an appropriate signal to the controller 26 which in turn will signal the pump 12 to cease operation through the dotted line 34A.

With reference to FIGS. 6 and 7, a further alternate form of the invention is shown which is similar to the form shown in FIGS. 4 and 5. In FIG. 6 and 7, the sensor 24C is a laser light sensor having emitter and receiver capabilities capable of reacting to the polished portion 42 which is located on the outer surface of tube 14 adjacent its discharge end 14A. The sensor 24C will recognize the polished portion 42 in the same manner that the sensor 24B recognized the colored portion 40 in the form of the invention shown in FIGS. 4 and 5, as described above. Both of the arrangements in FIGS. 4 and 5 and 6 and 7 serve to cause the pump 12 to be inoperative as the casing 32 is substantially removed from the tube 14.

A third alternate form of the invention is shown in FIGS. 8 and 9. A switch assembly 44 has a switch 46 and an actuator 48 connected to an arcuate foot 50 which is located just above the upper surface of stuffing tube 14. The switch assembly 44 also has a bushing 40 to facilitate its sliding engagement with the tube 14. The casing 32 normally assumes a position between the outer surface of tube 14 and the lower or outer surface of the foot 50 as best shown in FIG. 8.

A follower assembly 52 is a part of switch assembly 44 and is connected to a suitable power means 54 which is adapted to conventionally move switch assembly 44 in forward or reverse directions on the tube 14 as depicted by the arrow 36.

The casing 32 is installed on the tube 14 and under the foot 50 as described above. The follower assembly 52 is advanced by the power means 54 and pushes the natural casing 32 into the twister 16 while being filled with emulsion pumped through the stuffing tube.

Once the casing 32 is completely filled and removed from the stuffing tube 14 the foot 50 of the switch assembly 44 drops down and contacts the stuffing tube. (FIG. 9). This movement is then transferred via the actuator 48 to the switch 46. The switch then sends a signal to the controller 26 which instructs the pump 12 to stop pumping emulsion, and which instructs the power means 54 to stop its forward movement and begin to retract along the stuffing tube 14.

It is therefore seen that by use of a variety of sensors or by use of a mechanical switch, this invention permits the automatic control of the filling of natural casings with emulsion to facilitate the accelerated process of filling natural casings.

We claim:

1. A method of stuffing natural casings with emulsion, comprising, taking a length of hollow natural casing material, inserting into the casing material an emulsion stuffing tube having a first end and a discharge end for extruding emulsion into a casing on an outer surface of the stuffing tube, slidably mounting a collar element on the stuffing tube adjacent an end of the casing material nearest the first end of the stuffing tube, slidably advancing a first end of the casing material on the tube in a direction towards the discharge end of the tube to telescope the casing into a shirred condition along a first portion of the casing material, while leaving a non-shirred portion downstream of the shirred portion, progressively advancing the non-shirred portion of casing off of the tube and filling the same with emulsion from the discharge end of the tube, placing an indicia mark on the tube adjacent the discharge end of the tube, placing a sensor in the proximity of the indicia mark on the discharge end of the tube so that the sensor will sense the presence of the indicia mark, and connecting the sensor to a controller to cause the termination of flow of emulsion into the tube.

2. The method of claim 1 wherein the indicia mark is a polished surface on the tube.

3. The method of claim 2 wherein the sensor is a laser-type sensor.

4. The method of claim 2 wherein the sensor is a mechanical switch.

5. A machine for stuffing natural casings with emulsion, comprising, an emulsion stuffing tube on the machine having a first end and a discharge end for extruding emulsion into a natural casing on an outer surface of the stuffing tube, a collar element slidably mounted on the stuffing tube adjacent an end of the casing material nearest the first end of the stuffing tube, means for slidably advancing a first end of the casing material on the tube in a direction towards the discharge end of the tube to telescope the casing into a shirred condition along a first portion of the casing material, while leaving a non-shirred portion downstream of the shirred portion, to progressively advance the non-shirred portion of casing off of the tube and filling the same with emulsion from the discharge end of the tube, an indicia mark on the tube adjacent the discharge end of the tube, a sensor in the proximity of the indicia mark on the discharge end of the tube so that the sensor will sense the presence of the indicia mark, and the sensor connected to a controller to cause the termination of flow of meat emulsion into the tube.

6. The machine of claim 5 wherein the indicia mark is a polished surface on the tube.

7. The machine of claim 6 wherein the sensor is a laser-type sensor.

8. The machine of claim 6 wherein the sensor is a mechanical switch.

* * * * *